(No Model.)   3 Sheets—Sheet 1.

M. Y. RANSOM.
INTERLOCKING SPIRAL MOLDING AS AN ARTICLE OF MANUFACTURE.

No. 326,329.   Patented Sept. 15, 1885.

WITNESSES
W. M. Monroe.
Geo. W. King.

INVENTOR
Moses Y. Ransom
Leggett & Leggett
Attorneys

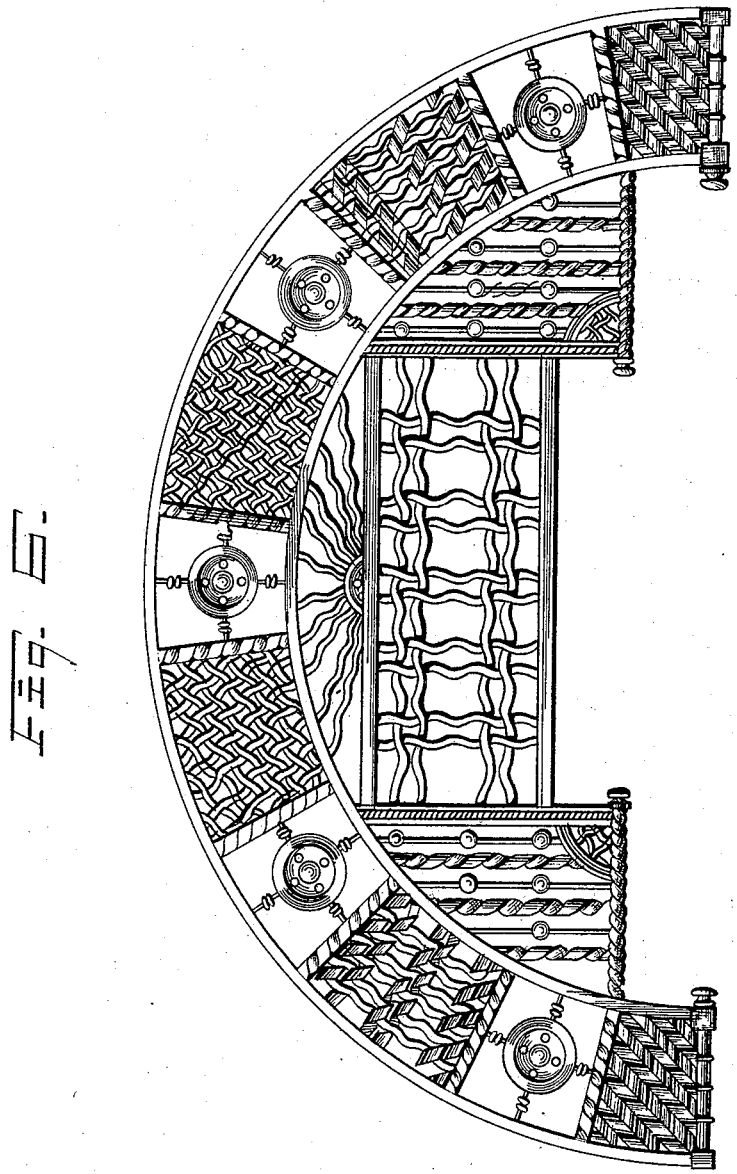

(No Model.) 3 Sheets—Sheet 3.
M. Y. RANSOM.
INTERLOCKING SPIRAL MOLDING AS AN ARTICLE OF MANUFACTURE.
No. 326,329. Patented Sept. 15, 1885.

UNITED STATES PATENT OFFICE.

MOSES Y. RANSOM, OF CLEVELAND, OHIO.

INTERLOCKING SPIRAL MOLDING AS AN ARTICLE OF MANUFACTURE.

SPECIFICATION forming part of Letters Patent No. 326,329, dated September 15, 1885.

Application filed June 27, 1885. (No model.)

*To all whom it may concern:*

Be it known that I, MOSES Y. RANSOM, of Cleveland, in the county of Cuyahoga and State of Ohio, have invented certain new and useful Improvements in Interlocking Spiral Moldings as an Article of Manufacture; and I do hereby declare the following to be a full, clear, and exact description of the invention, such as will enable others skilled in the art to which it pertains to make and use the same.

My invention relates to ornamental work or devices formed by interlocking machine-made spiral moldings as an article of manufacture, the object being to form a variety of new and ornamental patterns of open-work by interlocking, intermixing, or interweaving machine-made spiral moldings, said molding being made of such form that the interlocking, intermixing, or interweaving is done without bending or materially changing the normal form of the respective interlocking moldings. The mechanism for making such spiral molding is fully described in United States Letters Patent No. 307,332, granted to me October 28, 1884. Moldings suitable for this purpose can be made in a variety of forms, and may be combined in an almost endless variety of patterns.

In the accompanying drawings two varieties of moldings are illustrated, and several patterns are shown that are made by interlocking one or both of these varieties.

Figure 3:
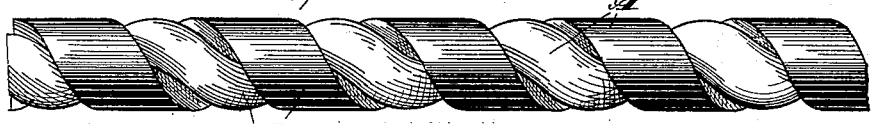
Fig. 3 shows the two kinds of moldings $a$ and $b$ run together by entering the molding $b$ into the groove of the molding $a$, and turning or running the molding $b$ to the position of parts shown. The molding $a$ might be considered as performing the functions of a nut, and the molding $b$ as acting as a screw.
Figure 2:
Fig. 2 shows a molding, $b$, round in cross-section and in the form of a spiral.
Figure 1:
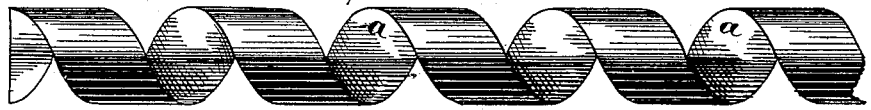
Figure 1 shows a round molding, $a$, with a deep spiral groove therein.
Figure 4:
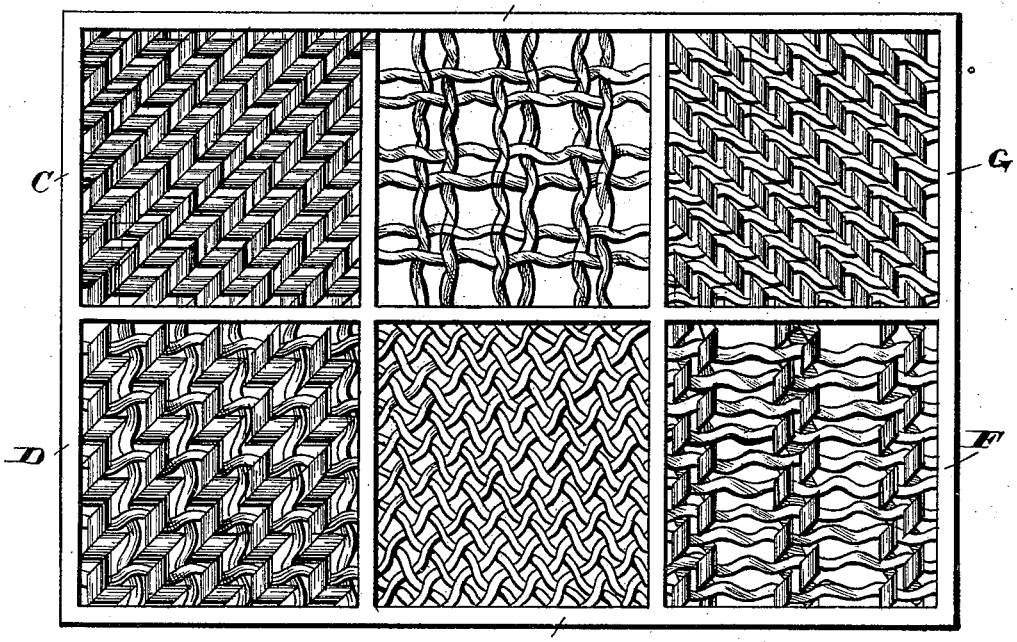

In Fig. 4 is shown a frame subdivided into six squares, each square being filled with a different pattern, each made by interlocking a series of one or both of the moldings $a$ and $b$. In pattern C a series of molding $a$ are arranged at suitable intervals and parallel with each other, and a series of the same moldings are screwed in or interlock with and at right angles to the first series. In pattern D a series of moldings $a$ and $b$ are arranged alternately and parallel, and interlock with a second series of moldings $a$ and $b$ at right angles with the first series, the second series of moldings $a$ and $b$ being also arranged alternately. Pattern E is formed entirely of the moldings $b$, the two series interlocking at right angles and set diagonally with the frame. Pattern F is the same as pattern D, except that every other molding $a$ is omitted. Pattern G consists of a series of parallel moldings $a$ interlocked at right angles by a series of moldings $b$. Pattern H is the same as pattern E, except that every third molding in each series is omitted.

Figure 5:
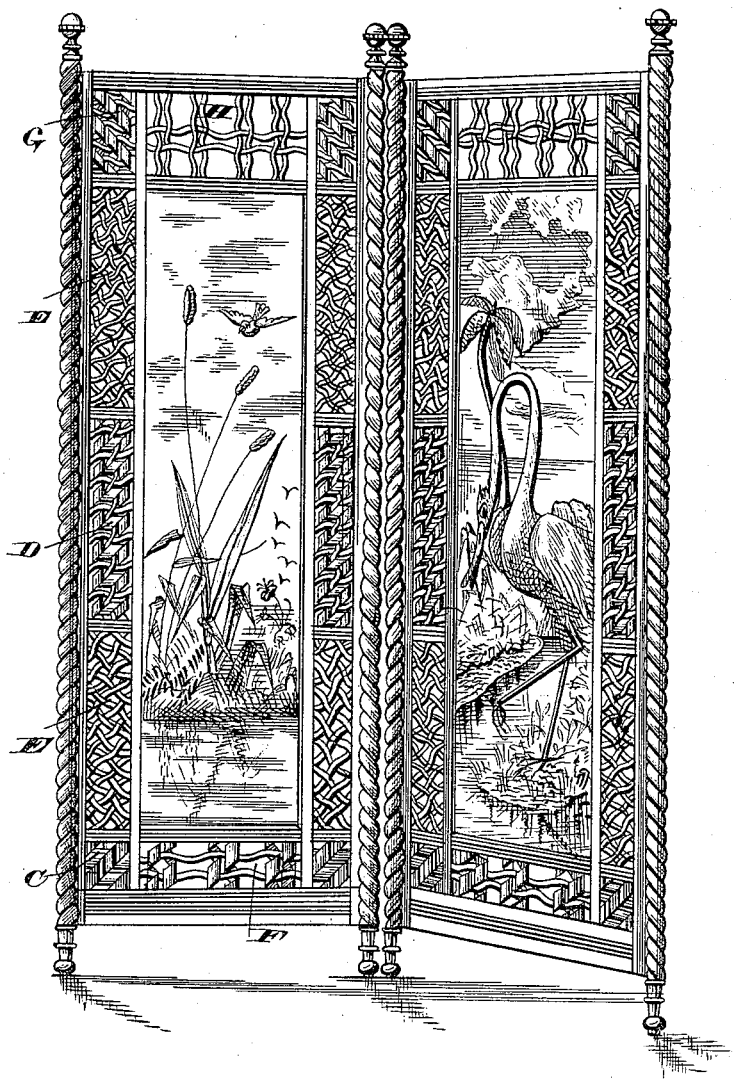

In Fig. 5 is shown a screen in which various patterns just described are arranged in the frame-work of the screen.

In Fig. 6 is shown a transom for the arch of a doorway in which the moldings $a$ and $b$ are utilized in different patterns and otherwise; also the combination-molding A is utilized in separating the different patterns.

These moldings may be combined in a great number of other patterns, and as the variety of moldings may be increased indifferently, the possible combinations of such moldings are almost endless.

In addition to the intrinsic beauty of these patterns, single or combined, different kinds of wood may be used in a single pattern, or in different patterns, to give brilliancy to the effect, and other kinds of moldings, not spiral, may be added; also carved and various ornamental devices may be introduced into or between the patterns of spiral interlocking moldings to give variety.

It is believed that the manufacture of ornamental work wrought from machine-made spiral interlocking moldings, as described, is an entirely new industry, and the products have the light, graceful, and brilliant effect of the best hand-made so-called "Oriental" or "Moorish" work, and can be produced at an initial cost much less than said hand-work and in patterns that are not practical by handwork.

My invention successfully brings within the reach of people of ordinary means articles of great beauty and utility heretofore only attainable by the rich at great cost, and through the skill and artistic efforts of high-priced hand-labor. It gives to the public forms, varieties, and effects of decoration never before attained. In short, it has opened up a new field of art, and constitutes a material contribution to the pleasures and attractiveness of homes.

What I claim is—

1. As an article of manufacture, a pattern of open or ornamental work composed of machine made interlocking or interwoven spiral moldings, substantially as set forth.

2. As an article of manufacture, a pattern of open or ornamental work composed in part or entirely of machine-made spiral moldings, said moldings being interlocked or interwoven, substantially as set forth.

3. As an article of manufacture, a pattern of open or ornamental work composed wholly or in part of machine-made spiral moldings, said moldings being interlocked, intermixed, or interwoven, substantially as set forth.

In testimony whereof I sign this specification, in the presence of two witnesses, this 12th day of June, 1885.

MOSES Y. RANSOM.

Witnesses:
CHAS. H. DORER,
ALBERT E. LYNCH.